(12) United States Patent
Shaw

(10) Patent No.: US 6,674,493 B2
(45) Date of Patent: Jan. 6, 2004

(54) HEAD MOUNTED DISPLAY USING SINGLE DISPLAY INCLUDING ONLY ONE LIQUID CRYSTAL SHUTTER

(75) Inventor: Jeff A. Shaw, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 10/038,959

(22) Filed: Jan. 2, 2002

(65) Prior Publication Data

US 2003/0122732 A1 Jul. 3, 2003

(51) Int. Cl.[7] .................. G02F 1/1335; G02B 27/22
(52) U.S. Cl. ................ 349/11; 349/15; 349/8; 359/462
(58) Field of Search ............... 349/11, 15, 16; 345/7, 8; 359/462, 630

(56) References Cited

U.S. PATENT DOCUMENTS

| | | | | |
|---|---|---|---|---|
| 5,467,205 A | * | 11/1995 | Kuba et al. .................. 349/5 |
| 5,572,343 A | * | 11/1996 | Okamura et al. ............. 349/74 |
| 5,682,173 A | * | 10/1997 | Holakovszky et al. ......... 345/8 |
| 5,712,649 A | * | 1/1998 | Tosaki ........................ 345/8 |
| 5,751,493 A | * | 5/1998 | Hur .......................... 359/630 |
| 5,912,650 A | * | 6/1999 | Carollo ...................... 345/7 |
| 6,055,109 A | * | 4/2000 | Hur .......................... 359/630 |
| 6,094,309 A | * | 7/2000 | Ophey ....................... 359/630 |
| 6,239,908 B1 | * | 5/2001 | Kelly ........................ 359/480 |
| 2002/0163600 A1 | * | 11/2002 | Divelbiss et al. ............. 349/15 |

FOREIGN PATENT DOCUMENTS

| | | |
|---|---|---|
| EP | 0 579 506 A1 | 1/1994 |
| WO | WO 00/39627 | 7/2000 |

* cited by examiner

Primary Examiner—Tarifur R. Chowdhury
(74) Attorney, Agent, or Firm—Trop, Pruner & Hu, P.C.

(57) ABSTRACT

A head mounted display may include a single liquid crystal display element. The display element may successively generate left and right image pairs. A beam slitter may be utilized to successively provide a first image to the left eye and a subsequent image to the right eye and so on so that a stereoscopic image may be produced from a single display element. As a result, the power consumption, cost, size and weight of the head mounted display may be reduced in some embodiments.

20 Claims, 2 Drawing Sheets

HEAD MOUNTED DISPLAY USING SINGLE DISPLAY INCLUDING ONLY ONE LIQUID CRYSTAL SHUTTER

BACKGROUND

This invention relates generally to head mounted displays that display an image that appears in front of the user.

Head mounted displays may utilize liquid crystal displays that are positioned close to the user's eyes to display a virtual image that appears to float in front of the user. The liquid crystal displays may be very small, and therefore relatively light, enabling a very portable display system. For example, the image may appear in front of the user allowing the user to move around while continuing to see the image. This may be useful in facilitating the completion of relatively complex tasks such as the assembly of products.

Of course, the lighter that the head mounted display can be made, the more the display generates an image without inconvenience to the user. The more the user's movements are obstructed by the weight of the display, the less likely users are to use these types of displays.

Conventionally, the head mounted display includes a liquid crystal display in front of each eye. Thus, stereoscopic or three dimensional images may be generated.

However, the added weight of the optics and the displays for each eye may increase the burden of the head mounted display on the user.

Therefore there is a need for better ways to provide head mounted displays with stereoscopic viewing.

DETAILED DESCRIPTION

Figure 1:
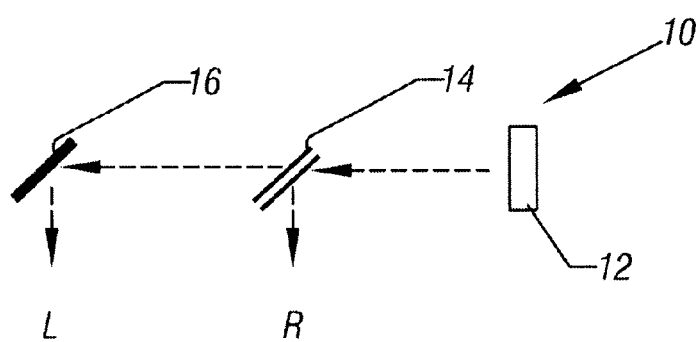
FIG. 1 is a schematic depiction of one embodiment of the present invention.

Referring to FIG. 1, a head mounted display 10 may include a liquid crystal display 12. The liquid crystal display 12 may be coupled to suitable processing devices not shown. Those devices may generate images for display on the liquid crystal display 12. In some cases, the processing devices may be part of the head mounted displays and in other cases, they may be remote therefrom.

The image produced by the liquid crystal display 12 is passed through a liquid crystal display shutter, mirror, and beam splitter 14. The liquid crystal display shutter of the beam splitter 14 allows an image at one instance to pass through the beam splitter 14 and at a following instance to be reflected thereby.

Thus, when the image is reflected, it may be viewed by the user's right eye, indicated as R in FIG. 1. Conversely, when the image is transmitted, it may be reflected from a parabolic mirror 16 for viewing by the user's left eye (L in FIG. 1).

The beam splitter 14 splits a beam into two separate images and does so at different times due to the operation of its liquid crystal display shutter. A liquid crystal display shutter is an electronically actuated device that changes the transmissivity and/or reflectivity characteristics of the beam splitter 14. Thus at one instance, the beam splitter 14 acts as a reflector and in the next instance, it acts as an effectively transparent device. As a result, left and right images may be successively applied to the left and right eyes. If this successive alternating of the images is done at high enough speed, it may not be noticed by the user.

As a result of the configuration of the head mounted display 10 shown in FIG. 1, a second liquid crystal display 12 is not needed. That is, a single liquid crystal display 12 can provide different images or frames at different instances of time to left and right eyes. As a result, the viewer believes that he or she is viewing persistent stereoscopic left and right images. The left and right images may be generated successively and selectively provided to the left and right eyes through the operation of the beam splitter 14.

As a result, the power consumption, weight and size of the head mounted display 10 may be dramatically reduced in some embodiments. Since liquid crystal shutters are relatively light, adding a shutter and removing a liquid crystal display results in a sizable weight reduction. Moreover, the liquid crystal shutter may be substantially less expensive than an additional liquid crystal display.

Figure 2:
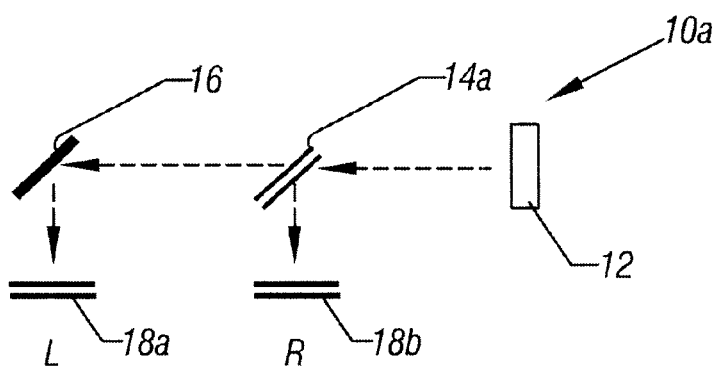
FIG. 2 is a schematic depiction of another embodiment of the present invention.

Referring to FIG. 2, the display 12 operates as described in connection with FIG. 1, however the beam splitter 14a provides only a beam splitting function. In this case, liquid crystal shutters 18a and 18b are provided for each of the left and right images viewed by the left (L) and right (R) eyes of the user. This somewhat increases the weight and size of a head mounted display 10a. However, it may simplify the design of the beam splitter 14.

Figure 3:
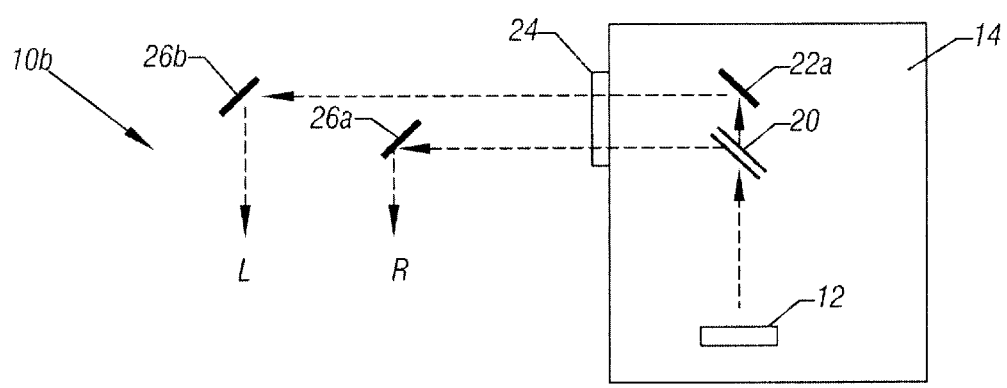
FIG. 3 is a schematic depiction of still another embodiment of the present invention.

Turning finally to FIG. 3, a head mounted display 10b may include a liquid crystal display shutter 20. In this case, an image generated by a liquid crystal display 12 can be selectively and successively shunted to the left and right eyes. For example, the display 12 image may be reflected by the beam splitter 22 to the mirror 26a for viewing by the right eye at a first instance of time and in the next instance of time it may be transmitted and then reflected by the mirror 22 to the mirror 26b for viewing by the left eye.

While mirrors are illustrated for providing the images to left and right eyes, in other embodiments a variety of other waveguides including fiber optic devices, glass, holographic or combinations of these devices may utilized.

In one embodiment, an adapter 24 may adapt for the different length of travel of the images for the left and right eyes. Thus, the adapter 24 may be a lens that has differential properties for the left and right images so that, as seen by the user, the image appears to come from the same distance. In one embodiment of the present invention, the display 12, the LCD shutter 20 and the beam splitter 22a may all be formed on an integrated circuit 14 which may include other components such as a processor. In addition, the elements 12, 20 and 22 may be formed on the integrated circuit 14 silicon substrate, for example using micromachining techniques. This integration may greatly reduce the size of the resulting product.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

generating an image from a single display; and successively providing that image through only one liquid crystal shutter in a head mounted display to the left and right eyes of a user.

2. The method of claim 1 wherein generating an image includes reflecting a beam to a first optical path in a first time instance and transmitting the beam to a second optical path in a second time instance.

3. The method of claim 2 including beam splitting a beam to provide separate images for the left and right eyes.

4. The method of claim 3 including beam splitting the beam to supply different images for each eye in different instances of time.

5. The method of claim 1 including splitting a beam into left and right channels and selectively displaying each channel to the user's eyes.

6. The method of claim 1 including generating an image from a display, and splitting the beam including the image into two channels for the left and right eyes.

7. The method of claim 6 including transmitting each channel to a different eye.

8. The method of claim 7 including accounting for the difference in path lengths between the first and second channels.

9. The method of claim 8 including displaying an image to one eye of a user in a first instance of time on a first channel and displaying an image at a second instance of time to the other eye of the user in a second channel.

10. A head mounted display comprising:
a single display element; and
a device to provide images from said display element to the left and right eyes of the user in different instances of time, wherein said device includes only one liquid crystal shutter.

11. The display of claim 10 wherein said device includes a beam splitter.

12. The display of claim 11 wherein said liquid crystal shutter and said beam splitter are separate devices.

13. The display of claim 10 wherein said liquid crystal shutter is integrated with a beam splitter.

14. The display of claim 10 including an integrated circuit which includes the display element, a beam splitter, and a liquid crystal shutter.

15. The display of claim 14 including an adapter to adapt for the different path lengths of light from the display element to the left and right eyes.

16. The display of claim 15 including a transmission medium for transmitting light split by the beam splitter to said left and right eyes.

17. The display of claim 16 wherein said transmission medium includes reflective surfaces.

18. A head mounted display comprising:
a display element;
a beam splitter to split light from said head mounted display into two light paths, one of said light paths to be directed to the user's left eye and the other of said light paths to be directed to the user's right eye; and
a liquid crystal shutter arranged to control the transmission of light to said light paths for the left and right eyes, wherein the display includes only one liquid crystal shutter.

19. The display of claim 18 wherein said beam splitter and said liquid crystal shutter are integrated together.

20. The display of claim 18 including an integrated circuit, said beam splitter and liquid crystal shutter integrated into said integrated circuit.

* * * * *